Sept. 14, 1943.   C. H. STEEL   2,329,425
MOLDING APPARATUS
Filed Jan. 29, 1943
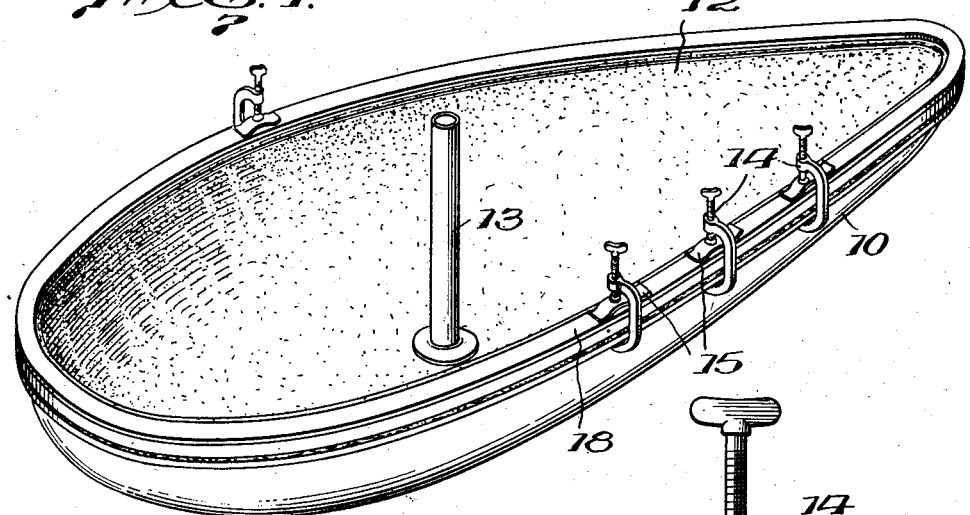
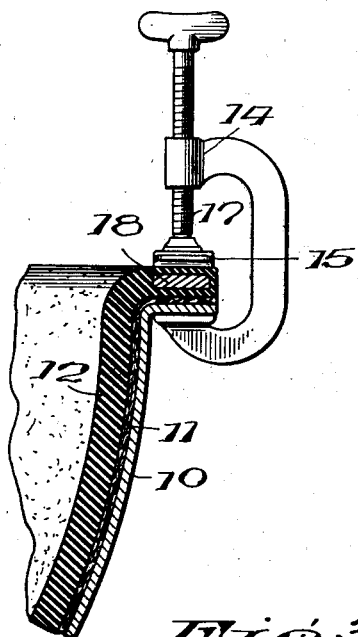
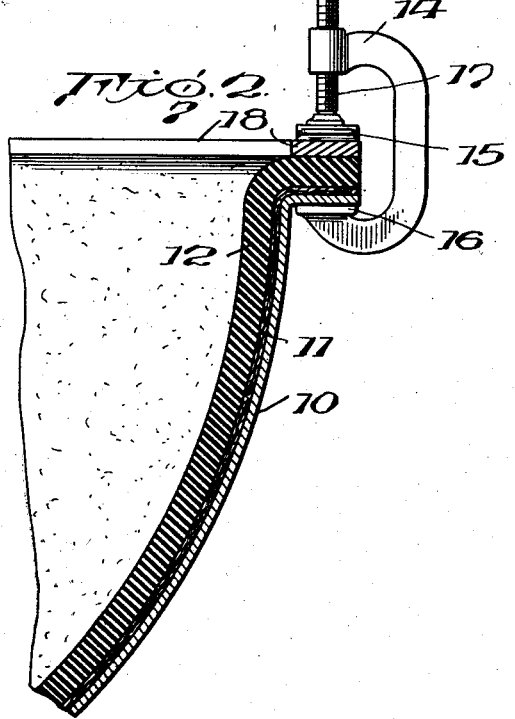
Inventor
Charles H. Steele,
By Church & Church
His Attorneys Patented Sept. 14, 1943

2,329,425

UNITED STATES PATENT OFFICE 2,329,425

MOLDING APPARATUS

Charles H. Steel, Auburn, N. Y., assignor to Columbian Rope Company, Auburn, N. Y., a corporation of New York Application January 29, 1943, Serial No. 473,985

6 Claims. (Cl. 18—35)

This invention relates to improvements in molding apparatus.

In molding certain compressible compositions, and particularly some of the modern plastics, for instance, phenolic or amino condensation products, which are set or cured under heat and pressure and which are used as a binder in combination with a filler, it has frequently been the practice to confine the material against a rigid mold member with a resilient flexible member and apply heat and pressure to the charged mold by placing it in a pressure chamber or autoclave to which steam or other gas is admitted under the desired pressure. This is commonly referred to as low pressure molding, but this is a relative term as the pressures used may run as high as one hundred and fifty pounds to the square inch. In this method of molding such materials as those mentioned, the material is sealed in the mold so that air can be evacuated from the material before the mold is placed in the autoclave and, also, in order that the gases can be evacuated during the actual molding and curing steps which are carried out in the autoclave. That is, while the pressure and temperature conditions in the autoclave are functioning to cause the material to conform to the rigid mold member and to effect a cure of the binder, the air or gases are withdrawn from the mass of material to prevent the formation of pockets, voids or other possible defects in the finished, molded article.

Where the rubber covering takes the form of a bag which fully envelopes the loaded mold, it is comparatively easy to effect the hermetic sealing of the bag. However, when a sheet of rubber, usually called a blanket, whose edges approximately coincide with those of the mold, is used, considerable difficulty is encountered in effecting and maintaining a seal between the edges of the blanket and mold. This is especially true as regards maintenance of a proper seal while the charged mold is being subjected to the molding and curing pressures and temperatures within the autoclave. For instance, due to increased temperatures in the autoclave, the rubber blanket becomes softer, so that, where clamps are used for clamping the blanket and mold edges together, the clamps tend to loosen their grip on the assembled parts. The increased temperatures also cause metallic clamping elements to expand so that their pressures on the assembled parts is partially relieved. In some instances, another factor entering the problem of maintaining the proper seal at the time mentioned is the reduction in the bulk of the material caused by the molding pressure in the autoclave. That is, if the material extends between the marginal portions of the blanket and mold, its bulk or thickness at this point may be reduced while being set and cured and, thus, cause any ordinary clamping means to become ineffective for the purpose intended.

The primary object of the present invention, therefore, is to provide a molding apparatus comprising a rigid mold member, a rubber member for confining the molding composition, and clamping means with which the material can be hermetically sealed between said members and said seal effectively maintained while the entire mold assembly is subjected to molding and curing pressures and temperatures.

Another object is to provide a clamping means for molding apparatus, such as indicated, which will compensate for expansion of the clamping means themselves and softening of the rubber member under varying temperature conditions and, if the seal is affected by a decrease in the bulk or thickness of the molding composition under the pressures used in the molding thereof, to compensate for such reduction in bulk.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a perspective view illustrating what is at present believed to be the preferred embodiment of the invention, a mold for molding half-sections of so-called jettison tanks being used for purposes of the illustration;

Fig. 2 is a detail sectional view taken vertically of one of the clamps or transversely of the marginal portions of the assembled mold; and Fig. 3 is a similar view illustrating a modified form of the invention.

Referring to Figs. 1 and 2, a rigid mold member is indicated at 10, the body of composition to be molded at 11, and the rubber cover or blanket at 12. A connection 13 for a vacuum pump (not shown) is provided on the blanket 12 and the edge portions of mold and blanket must, of course, be hermetically sealed in order to render the vacuum pump effective. For the reasons before stated, it is very difficult to maintain this marginal seal, especially while the mold and material therein are being subjected to the increased pressure and temperature within the autoclave. However, these difficulties are overcome with the present invention by clamping the marginal portions of the mold and blanket together with the edge of the material pinched between said marginal portions by a series of clamps 14, and a yielding pressure member 15, which serves as a follower, interposed between each clamp and the marginal portion of either the blanket or mold. In the present illustration, the clamps are of C-shape formation and the parts are clamped between what might be termed the base 16 of the clamp and the threaded clamping stem 17. The so-called follower 15, which may take the form of a flat strip of rather heavy spring steel arched or bowed longitudinally, is preferably positioned against the end of stem 17. Also, in order to prevent the ends of the springs 15 cutting or damaging the rubber blanket, a metal sealing ring 18 is preferably placed on the rim of the blanket and the ends of the springs bear against the ring with their arched portions spaced from the ring and engaged against the ends of the stems 17 of the clamps.

As will be understood, after the material to be molded and the rubber blanket have been assembled in the mold, the clamping ring is placed over the edge of the blanket and the clamps and associated springs, which may or may not be actually attached to the stems 17, are then installed, as shown, around the margins of the assembly. The threaded stems of the clamps are then adjusted until the material is so tightly clamped between the blanket and mold as to form an air-tight joint around the marginal portions thereof. This adjustment of said stems will, of course, tend to flex or straighten the springs 15. Air is then evacuated through the connection 13, after which the vacuum pump is disconnected and the loaded mold is placed in the autoclave. After the mold is placed in the autoclave, and before steam is admitted to the latter, connection 13 is again coupled to the vacuum pump, it being understood that the autoclave is provided with suitable connections for this purpose. The autoclave is then closed and steam admitted. As the pressure and temperature rise in the autoclave, the heat causes the clamps to expand and the rubber of the blanket to soften and the pressure reduces the bulkiness or thickness of material 11. Any one of these three conditions would break the seal at the margin of the mold, in the absence of springs 15. However, due to the presence of said springs and the fact that they were originally compressed by the clamps, it will be apparent that by reason of their tendency to always resume their normal arched or bowed shape, they will exert sufficient pressure on the ring and blanket to always maintain the marginal seal. If the clamp expands, or if the rubber becomes softer, the springs will compensate for the variance that would take place in the spacing of the clamp and ring. Likewise, as the material is compressed by the pressure in the autoclave, the tendency of the spring to bow will cause the ring and blanket to follow or maintain intimate contact with the material. Thus, the air-tight seal is always maintained, even during the curing and molding stage, so that the effectiveness of the vacuum pump will not be reduced during this period.

It will be appreciated that other types of clamps may be used and that the compensating member need not necessarily be made in the specific form of spring as is here shown.

In the modified form of apparatus, the so-called sealing ring 18 is carried by or embedded in the marginal portion of blanket 12. The compensating springs 15 function in the same manner, as in the previous illustration to maintain uniform pressure between the edge of the blanket and the mold throughout the molding process.

It will also be appreciated that, in some instances, the material may not extend between the marginal portions of the blanket and mold. However, under such circumstances, the utility of the present clamping means will not be affected because of the necessity of compensating for the expansion of the metal of which the clamp is made and for the softening of the rubber blanket.

What I claim is:

1. In a molding unit for molding a compressible material under heat and pressure, a rigid mold member, a rubber covering for confining the material against said member, clamps between which the edge portions of said rubber member and mold are compressed to hermetically seal the joint formed by said edge portions, and heat-resistant, resilient means carried by said clamps for compensating for the softening of the rubber cover while the material is being molded and maintaining the hermetic seal between the material and rigid member.

2. In a molding unit for molding a compressible material under heat and pressure, opposed mold members between which said material is confined, and clamps between which said members are forced together to hermetically seal the material between said members, said clamps compressing heat resistant, resilient means for pressing said members together to compensate for expansion of the clamping means under increased pressure while the material is subject to the molding temperatures and pressures.

3. In a molding unit for molding a compressible material under heat and pressure, a rigid mold member, a rubber cover for said member, said member and cover having mating flanges, a sealing ring overlying the cover flange, clamps, each having opposed clamping portions engaging over said ring and under the flange of said rigid mold to force said ring and flange together to form a hermetically sealed joint between said flanges, and a spring interposed between said ring and the co-operating portion of each clamp to compensate for the softening of the rubber and the decrease in the bulk of the material located between the blanket and mold flanges while under the influence of the molding pressure and temperatures.

4. In a molding unit for molding a compressible material under heat and pressure, a rigid mold member, a rubber cover for confining the material against said mold member, a rigid clamping ring extending around the edge of said cover, a series of clamps engaging said ring and mold for forcing said cover and said rigid member together, and a spring interposed between each clamp and said ring and adapted to be held under compression when said parts are clamped together.

5. In a molding unit for molding a compressible material under heat and pressure, a rigid mold member, a rubber cover for confining the material against said mold member, a rigid clamping ring extending around the edge of said cover, a series of clamps engaging said ring to force the ring and cover toward said rigid member, and a heat-resistant, resilient follower member interposed between each clamp and said ring.

6. In a molding unit comprising a substantially rigid mold member and a resilient member for confining molding material against the molding surface of said rigid member, the combination of means for hermetically sealing the material and rubber member around the perimeter of the rigid member, said sealing means comprising a series of clamps, each clamp having a pair of clamping surfaces between which the edges of said rigid member and rubber member are clamped, and a resilient metallic member interposed between one of said clamping surfaces and the clamped elements whereby expansion of clamps under increased temperatures and the softening of said rubber member under increased temperatures are compensated for and said hermetic seal maintined during the molding of the material under increased pressure and temperature.

CHARLES H. STEEL.